United States Patent
Yu

(10) Patent No.: US 12,511,588 B2
(45) Date of Patent: Dec. 30, 2025

(54) WORKSPACE RESERVATION USER VERIFICATION

(71) Applicant: Zoom Communications, Inc., San Jose, CA (US)

(72) Inventor: Chi-chian Yu, San Ramon, CA (US)

(73) Assignee: Zoom Communications, Inc., San Jose, CA (US)

( * ) Notice: Subject to any disclaimer, the term of this patent is extended or adjusted under 35 U.S.C. 154(b) by 552 days.

(21) Appl. No.: 17/829,914

(22) Filed: Jun. 1, 2022

(65) Prior Publication Data

US 2023/0394377 A1    Dec. 7, 2023

(51) Int. Cl.
*G06Q 10/02*      (2012.01)

(52) U.S. Cl.
CPC ................. *G06Q 10/0287* (2025.08)

(58) Field of Classification Search
CPC .... G06Q 10/02; G06Q 10/021; G06Q 10/022; G06Q 10/026; G06Q 10/027;
(Continued)

(56) References Cited

U.S. PATENT DOCUMENTS

| | | |
|---|---|---|
| 7,054,938 B2 | 5/2006 | Sundqvist et al. |
| 7,233,933 B2 | 6/2007 | Horvitz et al. |

(Continued)

FOREIGN PATENT DOCUMENTS

| | | | | |
|---|---|---|---|---|
| GB | 2580364 A | * | 7/2020 | ....... G06Q 10/06314 |
| WO | 2015017664 A2 | | 2/2015 | |

(Continued)

OTHER PUBLICATIONS

W. M. Salama and M. H. Aly, "Workspace Mobile Application Finder Based on Machine Learning Approach, " 2023 33rd International Conference on Computer Theory and Applications (ICCTA), Alexandria, Egypt, pp. 218-222, doi: 10.1109/ICCTA60978.2023. 10969287. (Year: 2023).*

(Continued)

*Primary Examiner* — Rupangini Singh
*Assistant Examiner* — Lisa Ma
(74) *Attorney, Agent, or Firm* — Young Basile Hanlon & MacFarlane, P.C.

(57) ABSTRACT

An identity of a software user occupying a workspace is verified against a reservation for the workspace using information associated with a workspace resource, such as a computer docking station, and information associated with a computing device of the user. A determination may be made that a computing device is connected to a computer docking station located at a workspace. Based on the computing device connecting to the computer docking station, a first identifier associated with the computing device and a second identifier associated with the computer docking station may both be obtained from the computing device. The first identifier and the second identifier may be compared against a reservation record associated with the workspace to determine whether a user of the computing device has an active reservation for the workspace. Output for display at the computing device may then be provided based on an outcome of the comparison.

20 Claims, 8 Drawing Sheets

(58) Field of Classification Search
CPC ............ G06Q 10/028; G06Q 10/0281; G06Q 10/0283; G06Q 10/0285; G06Q 10/0287
USPC .......................................................... 705/5
See application file for complete search history.

(56) References Cited

U.S. PATENT DOCUMENTS

| | | | |
|---|---|---|---|
| 7,289,619 | B2 | 10/2007 | Vivadelli et al. |
| 8,644,473 | B1 | 2/2014 | Bardwell et al. |
| 8,718,619 | B2 | 5/2014 | Lidstrom et al. |
| 9,172,733 | B2 | 10/2015 | Warrick et al. |
| 9,300,925 | B1 | 3/2016 | Zhang |
| 9,495,465 | B2 | 11/2016 | Bowers et al. |
| 9,639,875 | B1 | 5/2017 | Elliott et al. |
| 9,697,046 | B2 | 7/2017 | Moroski et al. |
| 9,734,511 | B2 | 8/2017 | Wood |
| 9,781,176 | B2 | 10/2017 | Xin et al. |
| 10,062,045 | B2 | 8/2018 | Brown |
| 10,075,387 | B1 | 9/2018 | Avasol |
| 10,083,490 | B2 | 9/2018 | Williams, II et al. |
| 10,091,329 | B2 | 10/2018 | Kuo et al. |
| 10,181,139 | B2 | 1/2019 | Glass et al. |
| 10,289,966 | B2 | 5/2019 | Daher et al. |
| 10,296,851 | B2 | 5/2019 | Klein et al. |
| 10,477,396 | B2 | 11/2019 | Schultz et al. |
| 10,554,725 | B2* | 2/2020 | Kumar ............... H04N 21/2543 |
| 10,600,013 | B2 | 3/2020 | Koppel et al. |
| 10,686,851 | B2 | 6/2020 | Warrick et al. |
| 10,860,954 | B1* | 12/2020 | Yeluguri ................ G06F 18/21 |
| 10,882,185 | B2 | 1/2021 | Vu et al. |
| 10,911,499 | B2 | 2/2021 | Warrick et al. |
| 10,998,970 | B1 | 5/2021 | Passe |
| 11,004,161 | B2 | 5/2021 | Nishida |
| 11,583,457 | B2 | 2/2023 | Burton et al. |
| 11,909,662 | B2 | 2/2024 | Lee et al. |
| 2002/0188489 | A1 | 12/2002 | Cheng et al. |
| 2004/0003042 | A1 | 1/2004 | Horvitz et al. |
| 2005/0071213 | A1* | 3/2005 | Kumhyr ............ G06Q 10/0631 705/7.12 |
| 2005/0193023 | A1 | 9/2005 | Ismail |
| 2006/0224427 | A1 | 10/2006 | Salmon |
| 2008/0059254 | A1 | 3/2008 | Vivadelli et al. |
| 2012/0054355 | A1 | 3/2012 | Arrasvuori et al. |
| 2013/0311925 | A1 | 11/2013 | Denker et al. |
| 2014/0278594 | A1 | 9/2014 | Vivadelli et al. |
| 2015/0039357 | A1 | 2/2015 | Segal et al. |
| 2015/0112738 | A1 | 4/2015 | Marinaro et al. |
| 2016/0267402 | A1 | 9/2016 | Szabo |
| 2016/0300160 | A1 | 10/2016 | Klein et al. |
| 2017/0026806 | A1 | 1/2017 | Jampani et al. |
| 2017/0054734 | A1* | 2/2017 | Sigal ............... G06Q 10/06398 |
| 2017/0255880 | A1 | 9/2017 | Daher et al. |
| 2017/0286853 | A1 | 10/2017 | Liensberger et al. |
| 2017/0316383 | A1* | 11/2017 | Naganathan ....... G06Q 10/1095 |
| 2017/0331770 | A1 | 11/2017 | Griffin et al. |
| 2017/0357917 | A1* | 12/2017 | Holmes ............ G06Q 10/06314 |
| 2018/0267594 | A1 | 9/2018 | Meier et al. |
| 2018/0285777 | A1 | 10/2018 | Li et al. |
| 2018/0308029 | A1 | 10/2018 | Löffler et al. |
| 2019/0012614 | A1 | 1/2019 | Yamada et al. |
| 2019/0213465 | A1 | 7/2019 | Avrahami et al. |
| 2019/0228348 | A1 | 7/2019 | O'Keefe-Sally et al. |
| 2019/0228350 | A1 | 7/2019 | Klein et al. |
| 2019/0260590 | A1* | 8/2019 | Kuenzi .................... H04W 4/80 |
| 2019/0306267 | A1 | 10/2019 | Lee et al. |
| 2019/0311303 | A1 | 10/2019 | Kanteti et al. |
| 2020/0096346 | A1* | 3/2020 | Dhandapani ........... G06Q 10/02 |
| 2020/0118045 | A1 | 4/2020 | Chung et al. |
| 2020/0174825 | A1 | 6/2020 | Hayashi |
| 2020/0218324 | A1 | 7/2020 | Decamp et al. |
| 2020/0302344 | A1* | 9/2020 | Just ................... G06Q 10/06312 |
| 2020/0305160 | A1 | 9/2020 | Zeng |
| 2020/0311619 | A1 | 10/2020 | Ramirez Flores et al. |
| 2020/0311635 | A1 | 10/2020 | Emig et al. |
| 2020/0312120 | A1 | 10/2020 | VanBlon et al. |
| 2020/0410407 | A1 | 12/2020 | Hashimoto |
| 2021/0065069 | A1 | 3/2021 | Yeluguri et al. |
| 2021/0150423 | A1 | 5/2021 | Tomosugi et al. |
| 2021/0208631 | A1* | 7/2021 | Benson .................... H04M 1/04 |
| 2021/0233035 | A1 | 7/2021 | Lee et al. |
| 2021/0350333 | A1 | 11/2021 | Hashimoto |
| 2021/0357878 | A1 | 11/2021 | Suzuki |
| 2021/0392550 | A1 | 12/2021 | Saito |
| 2022/0053036 | A1* | 2/2022 | Vashisht ................. G06Q 10/02 |
| 2022/0229468 | A1* | 7/2022 | Roose .................... G06F 1/1637 |
| 2022/0239639 | A1* | 7/2022 | Jasleen ................... G06F 21/36 |
| 2022/0327438 | A1* | 10/2022 | Bach .................. G06K 7/10297 |
| 2022/0350770 | A1 | 11/2022 | Bach et al. |
| 2023/0049989 | A1 | 2/2023 | Franc De Ferriere et al. |
| 2023/0050116 | A1* | 2/2023 | Franc De Ferriere . G06Q 10/02 |
| 2023/0236632 | A1* | 7/2023 | Lukanc ..................... G06F 8/65 361/679.41 |
| 2023/0274198 | A1* | 8/2023 | Park ...................... G06Q 50/163 705/5 |

FOREIGN PATENT DOCUMENTS

| | | | |
|---|---|---|---|
| WO | 2018236862 A1 | 12/2018 | |
| WO | WO-2024175238 A1 * | 8/2024 | ............ G06Q 10/02 |

OTHER PUBLICATIONS

International Search Report and Written Opinion mailed on Oct. 18, 2022 in corresponding PCT Application No. PCT/US2022/038490.
International Search Report and Written Opinion mailed on Nov. 4, 2022 in corresponding PCT Application No. PCT/US2022/038493.
Sood T, Janssen P and Miller C; "Spacematch: Using Environmental Preferences to Match Occupants to Suitable Activity-Based Workspaces", 2020, Front. Built Environ. vol. 6:113 (Year: 2020).
International Search Report and Written Opinion mailed on Aug. 30, 2023 in corresponding PCT Application No. PCT/US2023/023544.
International Search Report and Written Opinion mailed on Jul. 31, 2023 in corresponding PCT Application No. PCT/US2023/019604.

* cited by examiner

WORKSPACE RESERVATION USER VERIFICATION

FIELD

This disclosure generally relates to workspace reservation user verification, and, more specifically, to verifying an identity of a software user occupying a workspace against a reservation for the workspace using information associated with a workspace resource of the workspace and information associated with a user resource of the user.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
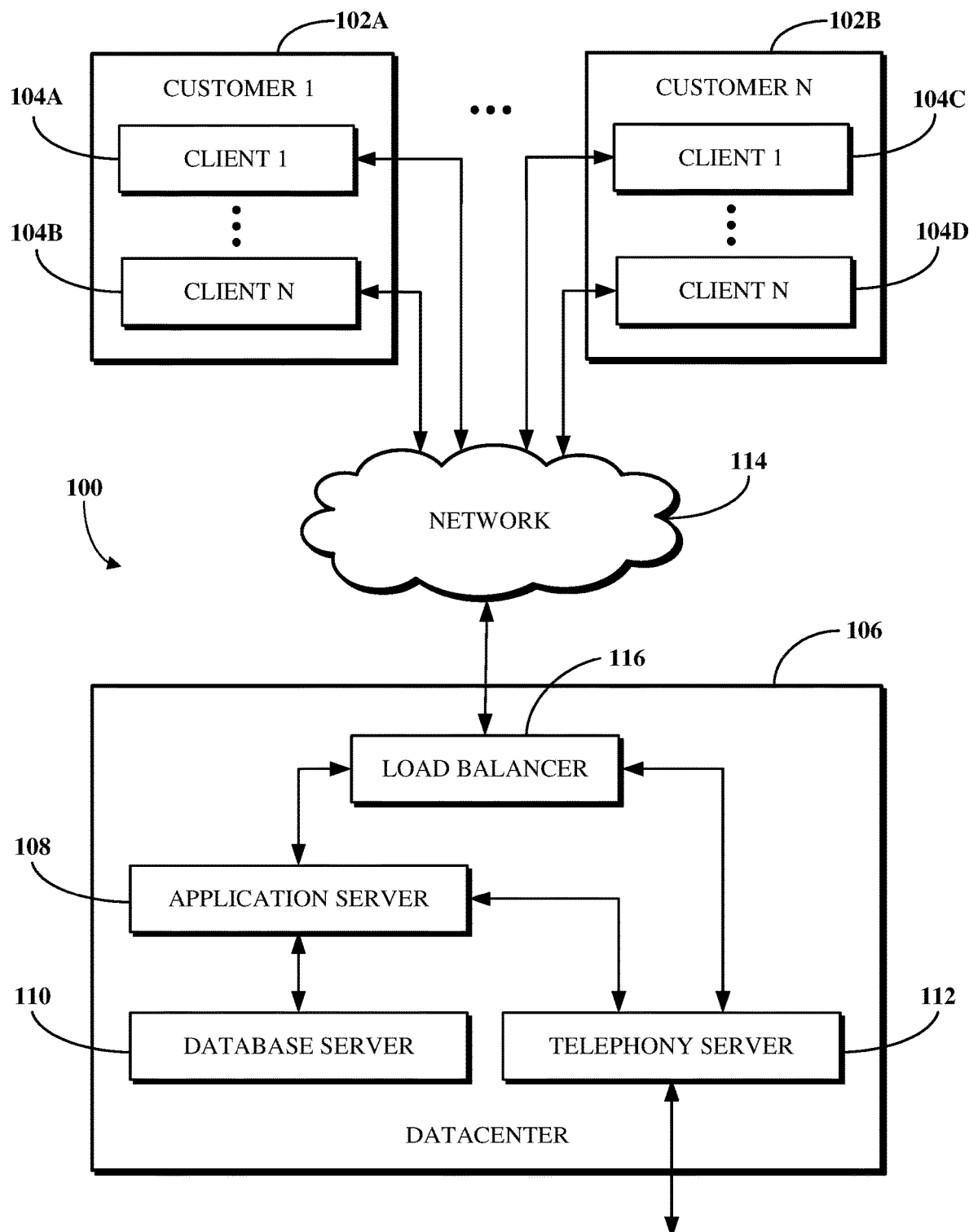
FIG. 1 is a block diagram of an example of an electronic computing and communications system.

The ubiquity of connected devices and increased availability of high network throughput has enabled workers in a variety of industries to work remotely from locations other than physical office spaces. In some cases, workers may have the option to exclusively work remotely, such as from their homes. In other cases, workers may be given flexibility to work remotely on some days and in a physical office space on others. As more workers move toward such hybrid work arrangements, fixed resource reservations, including but not limited to permanent workspace assignments and accompaniments (e.g., nameplates and information technology device assignments), may be less frequently used. However, when such hybrid workers are present in a physical office space, they will still need reliable access to workspaces such as desks, offices, conference rooms, and the like, and in some cases related resources such as phones and computer docking stations. It is therefore very important that office systems become more dynamic to enable workers to reserve workspaces for use (e.g., on an hourly or daily basis) while present at the office.

Some office systems accordingly allow users to dynamically reserve workspaces for certain periods of time during which they expect to be at a subject premises (e.g., an office suite). Typically, to reserve a workspace, a user of a software service made available to the office system (e.g., via a software platform, such as a unified communications as a service (UCaaS) platform) may access a web application or mobile application on their personal device or use a shared device at the subject premises to view a list of workspaces available for reservation and make a reservation for one. Once the reservation has been made, the reserved workspace will become unavailable for reservation by others, and the user may, at the start of the reservation time period, begin using the reserved workspace, as desired.

However, given the potentially large number of workspaces that may be present at a premises (or a set of premises, such as where the workspace reservation software service covers workspaces at multiple suites and/or buildings of a campus), in some cases, a user may mistake a different workspace for the one they reserved. This mistake may ultimately create problems for the premises and users who want to use workspaces within the premises. For example, the different workspace that the user enters and begins using may actually be under a reservation for a different user. In some cases, the different user may seek to avoid conflict and simply choose a different workspace for themselves, potentially disrupting another reservation. In another example, the reserved workspace will be both unused by the user and still listed as unavailable by the workspace reservation software service. This may limit resource availability for users and, in some cases, prevent groups of users from reserving workspaces nearby one another.

Some workspace reservation approaches use network-connected (e.g., Internet of Things (IoT)) sensors to detect that a reservable workspace is occupied. For example, one or more motion sensors may be deployed for use with individual workspaces or groups of workspaces to detect, at a given time when sensor data is made available, which workspaces are or are not vacant. While such approaches may be useful for terminating reservations for workspaces that go unused for periods of time, they do not actually verify that a user who is occupying the subject workspace is the user for whom the workspace is reserved.

Other workspace reservation approaches may deploy radio frequency scanners or other devices which present scannable codes (e.g., QR codes) at individual workspaces and require that users entering those workspaces verify themselves (e.g., using an employee badge with a radio frequency identifier tag embedded or using a mobile device with a camera configured to process a QR code) as part of the reservation process. However, such devices require additional expenditures, deployments, information technology management, and the like to use. Meanwhile, conventional workspace reservation approaches entirely ignore resources that are already provisioned for use at the workspaces, such as computer docking stations, which could potentially be leveraged to verify that a user who is occupying the subject workspace is the user for whom the workspace is reserved without requiring additional expenditures, deployments, information technology management, and the like to use.

Implementations of this disclosure address problems such as these by verifying an identity of a software user occupying a workspace against a reservation for the workspace using information associated with a workspace resource of the workspace, such as a computer docking station, and information associated with a user resource of the user, such as a computing device which connects to the computer docking station. A determination may be made that a user resource (e.g., a computing device) is connected to a workspace resource (e.g., a computer docking station) located at a workspace. Based on the user resource connecting to the workspace resource, a first identifier associated with the user resource and a second identifier associated with the workspace resource may both be obtained from the user resource. The first identifier and the second identifier may be compared against a reservation record associated with the workspace to determine whether a user of the user resource has an active reservation for the workspace. Output for display at the computing device may then be provided based on an outcome of the comparison. For example, where the comparison indicates that the first identifier and the second identifier match the reservation record, the output may indicate that the user of the user resource is at the correct workspace. In another example, where the comparison indicates that the first identifier and the second identifier do not match the reservation record, the output may indicate a location of a different workspace associated with the user of the user resource or a prompt for allowing the user to change their workspace reservation to the current workspace. The implementations of this disclosure thus enable the verification of users against workspace reservations using resources already provisioned for work use within workspaces (e.g., computer docking stations remaining at the workspaces between reservations therefor) and thus without requiring or otherwise using additional sensors, devices, or the like that would otherwise introduce additional deployment, management, and like requirements and costs.

To describe some implementations in greater detail, reference is first made to examples of hardware and software structures used to implement a system for workspace reservation user verification. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over Internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
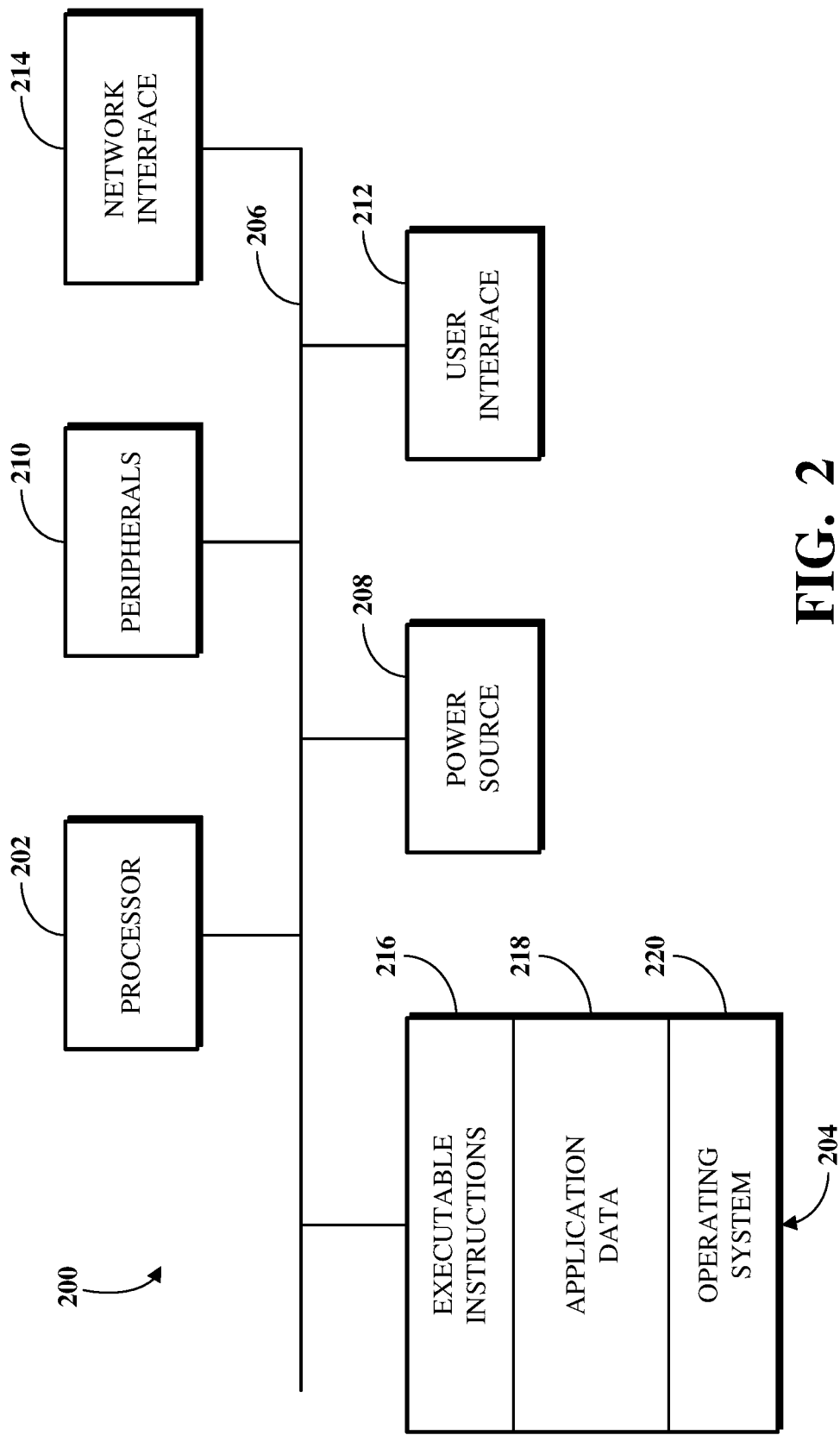
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
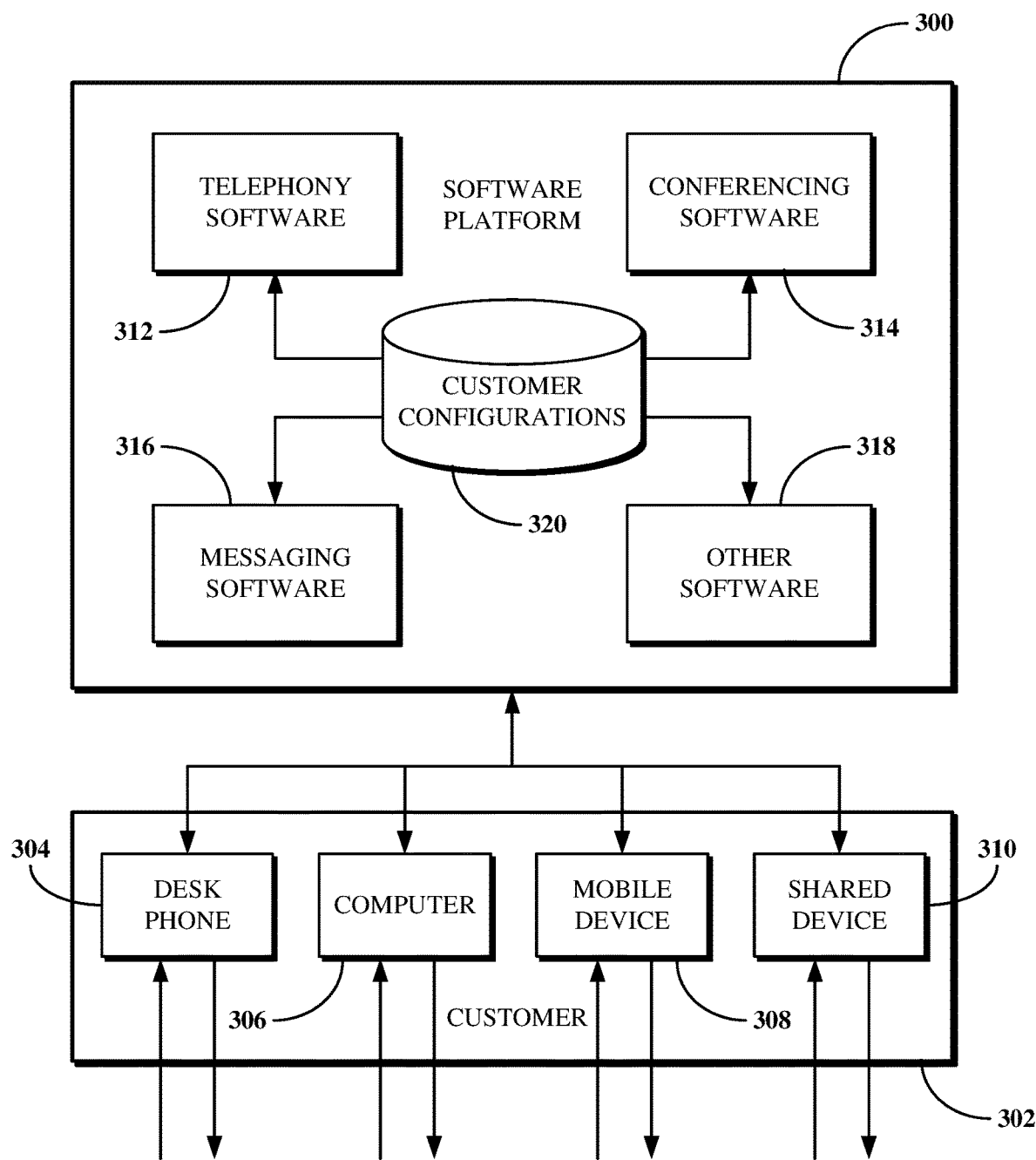
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include workspace reservation user verification software, such as for verifying an identity of a software user occupying a workspace against a reservation for the workspace using information associated with a workspace resource of the workspace and information associated with a user resource of the user.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
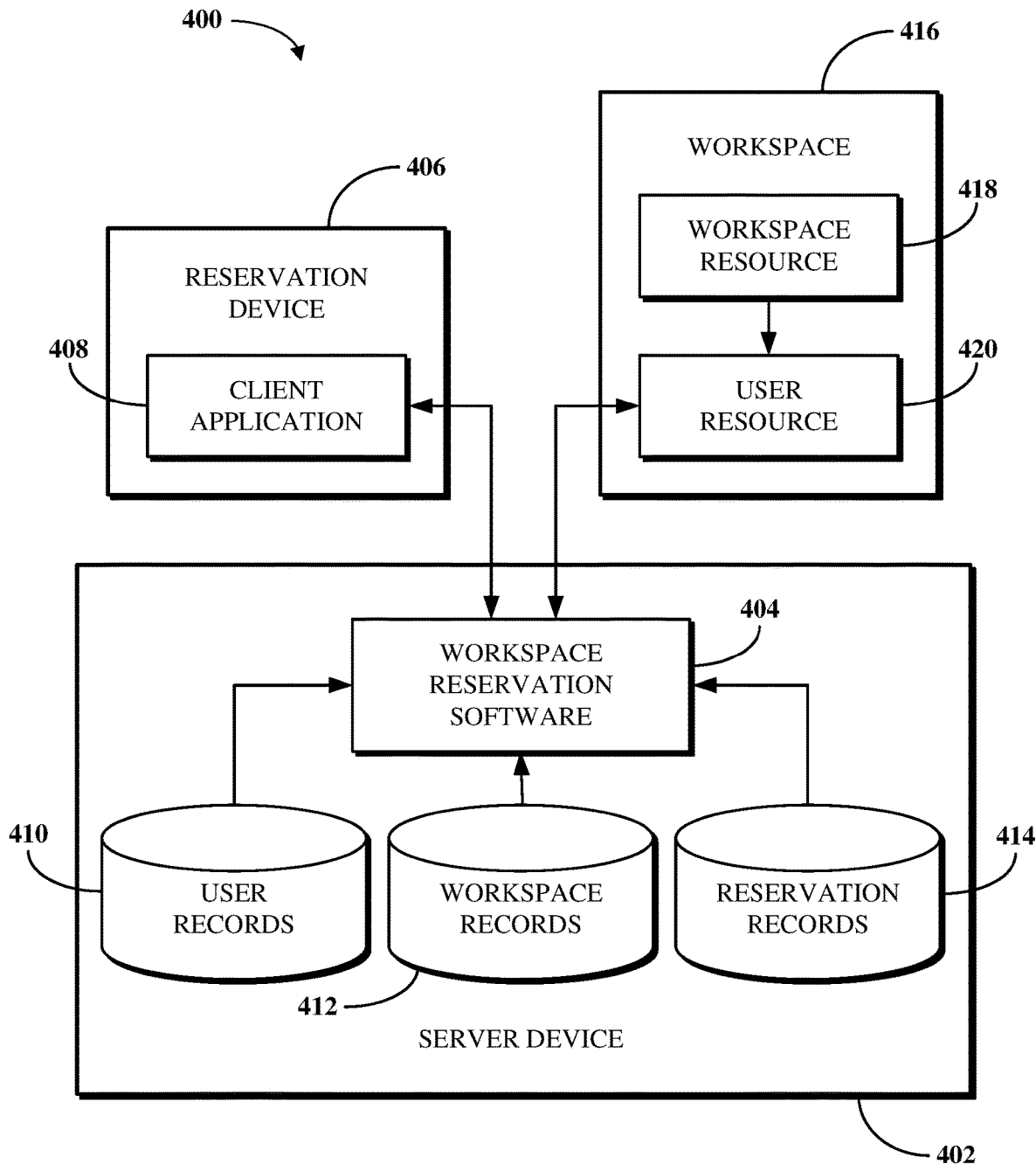
FIG. 4 is a block diagram of an example of a system for workspace reservation user verification.

FIG. 4 is a block diagram of an example of a system 400 for workspace reservation user verification. The system 400 includes a server device 402, which may, for example, be a server device used to implement some or all of a software platform, for example, the software platform 300 shown in FIG. 3. In particular, the server device 402 runs workspace reservation software 404 for facilitating reservations of workspaces by users of the software platform for use within a premises at which those workspaces are located. In particular, the workspace reservation software 404 is configured to process requests for workspace reservation for various users and to verify identities of users occupying workspaces against reservation records generated based on such requests. The workspace reservation software 404 may, for example, be the resource reservation software described above with respect to the other software 318 shown in FIG. 3. A premises within which a reservable workspace is located may, for example, refer to an office spanning one or more rooms of a suite, one or more suites on a floor of a building, one or more floors of a building, and/or one or more buildings.

As shown, the workspace reservation software 404 interacts with a reservation device 406. The reservation device 406 is a computing device usable by a user to reserve a workspace. For example, the reservation device 406 may be a personal device, such as a tablet computer or smartphone. In another example, the reservation device 406 may be a shared device, such as a digital signage device (e.g., a kiosk or other device located in a lobby of a premises). Although a single reservation device 406 is shown, in some implementations, multiple reservation devices including the reservation device 406 may interact with the workspace reservation software 404 at a given time, such as to allow the simultaneous reservation of workspaces by or otherwise for multiple users.

The reservation device 406 runs a client application 408 configured to communicate with the workspace reservation software 404. In particular, the client application 408 is software including functionality for transmitting a request for a workspace reservation to the workspace reservation software 404 and for presenting output associated with a processing of that request from the workspace reservation software 404. For example, the client application 408 includes one or more graphical user interfaces configured to visually output information associated with workspaces which are available for reservation and/or which are unavailable for reservation (e.g., because they are under an active reservation by another user). A user of the reservation device 406 may navigate through the one or more graphical user interfaces as part of a workspace reservation process. For example, a first graphical user interface of the graphical user interfaces may prompt a user to input information about themselves and/or the purpose of their visit to the premises for reserving a workspace. In another example, a second graphical user interface of the graphical user interfaces may present, in either an illustrative map or text-based list view, information associated with workspaces at the premises. In yet another example, a third graphical user interface of the graphical user interfaces 408 may indicate, based on (e.g., in response to) a selection of a workspace or another workspace by the user via the second graphical user interface, directions for locating the workspace selected by the user. In some implementations, a single graphical user interface may statically remain output to the display of the reservation device 406 and partially or wholly cycle through portions of the information described above.

The reservation device 406 may connect to the server device 402 to access the workspace reservation software 404 over a network, for example, the network 114 shown in FIG. 1. As such, in at least some cases, information made available to the client application 408 via the workspace reservation software 404 may be received at the reservation device 406 via the network. In some implementations, where the server device 402 is a local computing device located at the premises (e.g., a local node) rather than in an external location such as a datacenter, the network connecting the server device 402 and the reservation device 406 may be a public or private local network configured for use by the server device 402 and the reservation device 406.

The workspace reservation software 404, as part of a process for fulfilling a workspace reservation request from the reservation device 404, may store or otherwise update records within one or more data stores, including a user records data store 410, a workspace records data store 412, and a reservation records data store 414. Records stored within the data stores 410 through 414 may be all of the same type or format or may be of different types and/or formats. For example, the data stores 410 through 414 may in some cases all store the records thereof in a table format. In another example, one of the data stores 410 through 414 may store records thereof in a table format while another of the data stores 410 through 414 may store records thereof in a comma separated value format. As shown, the data stores 410 through 414 are located at the server 402. However, in some implementations, one or more of the data stores 410 through 414 may be located other than at the server 402, provided such other location is accessible to the workspace reservation software 404. Although three data stores 410 through 414 are shown, in some implementations, any combination of the data stores 410 through 414 may be combined into a single data store.

The user records data store 410 stores records associated with a user from or otherwise for whom a workspace reservation request is processed by the workspace reservation software 404. The user may, for example, be the user of the reservation device 406 who interacts with the workspace reservation software 404 via the client application 408 to make a reservation for a workspace 416 located at the premises. For example, a record stored within the user records data store 410 may correspond to a single user and indicate one or more of a name or other identifier of the user, devices registered to or otherwise for use by the user, digital certificates issued to such devices, identifiers of workspaces previously reserved by or for the user, dates and/or times of previous workspace reservations of the user, or preferences of the user (e.g., resources required by the user to be present at a workspace reserved by the user, such as computer docking stations, phones, doors, windows, or the like).

The workspace records data store 412 stores records associated with workspaces which are generally capable of being reserved by or for users at the premises. For example, a record stored within the workspace records data store 412 may correspond to a single workspace and indicate information including one or more of a name or identifier of the workspace, a location of the workspace (e.g., based on manually-derived or machine learning-derived labels for locations within a premises, such as different floors, suites, rooms, or other areas), resources available for use at the workspace (e.g., phones, computing devices, doors, or windows), a number of people capable of concurrently using the workspace (e.g., one for a desk or some number of multiple people for a conference room), a number of times the workspace has been reserved (e.g., in sum or over some period of time), or a total amount of time during which reservations have been active for the workspace (e.g., in sum or over some period of time).

The reservation records data store 414 stores records associated with past reservations by or for users of workspaces within a premises. For example, a record stored within the reservation records data store 414 may correspond to a single workspace reservation for a single user and indicate information including one or more of a name or other identifier of the user by or for whom a reservation for a subject workspace was made, a name or other identifier of the subject workspace, a date and time at which the reservation was made, a period of time during which the workspace remained active (e.g., the length of the reservation or a shorter term if the reservation was prematurely terminated by or for the user), or whether or not the reserved workspace was occupied by the subject user during the reservation period.

After a user of the reservation device 406 has completed a workspace reservation process, the workspace reservation software 404 may, in any order, generate and store or otherwise update a record within each of the data stores 410 through 414. For example, a record may be generated and stored or otherwise updated within the user records data store 410 to identify that the user has made a reservation and information associated with the reservation. A record may then be generated and stored or otherwise updated within the workspace records data store 412 to identify that the subject workspace (e.g., the workspace 416) is reserved and thus unavailable to others during a period of time associated with the reservation. A record may thus be generated and stored within the reservation records data store 414 to link the subject user and the subject workspace in connection with the reservation made by or for the subject user for the subject workspace. For example, the record generated and stored within the reservation records data store 414 may include an identifier associated with the subject user and an identifier associated with the subject workspace.

Reservable workspaces, such as the workspace 416, include one or more resources which may be used by a user during a workspace reservation, such as a workspace resource 418. The workspace resource 418 is a thing which remains at the workspace 416 between reservations by users. Importantly, the workspace resource 418 is something which is provided for various users to use in connection with their ability to work at the workspace 416. For example, the workspace resource 418 may be a computer docking station to which a computing device of a user may be connected (i.e., docked). The user connects a user resource 420 to the workspace resource 418 after the user begins occupying the workspace 416. The user resource 420 is a thing which is possessed, operated, or otherwise controlled by the user and which may be brought into the workspace 416 when the user begins occupying the workspace 416 and removed from the workspace 416 once the user is no longer occupying the workspace 416. For example, the user resource 420 may be a computing device, such as a laptop computer or a mobile phone.

The user connects the user resource 420 to the workspace resource 418 at some point after the user enters the workspace 416. Based on the user resource 420 connecting to the workspace resource 418, a user verification process is initiated in a software background either locally (e.g., at the user resource 420) or at a cloud service (e.g., at the workspace reservation software 404) to verify an identity of the user against a reservation record associated with the workspace 416. In particular, the user verification process may include obtaining a first identifier associated with the user resource 420 and a second identifier associated with the workspace resource 418, such as from the user resource 420 based on the user resource 420 connecting to the workspace resource 418. In one particular example, where the user resource 420 is a computing device (e.g., a laptop computer) and the workspace resource 418 is a computer docking station, the first identifier may correspond to a digital certificate issued to the computing device and the second identifier may correspond to an identifier (e.g., an ethernet media access control (MAC) address or other MAC address) assigned to the computer docking station. The first identifier and the second identifier may then be compared against a reservation record associated with the workspace stored within the reservation records data store 414 to determine whether the user associated with the user resource 420 has an active reservation for the workspace 416. Output may then be provided (e.g., for display at the user resource 420, as applicable) based on an outcome of the comparison.

The first identifier and the second identifier may be obtained from the user resource 420 over an established network connection between the user resource 420 and the server device 402. For example, where the user resource 420 is a computing device such as a laptop, agent software running in a background of a client application or otherwise as a background process at the user resource 420 may use a network connection to communicate with the workspace reservation software 404. The user resource 420 may thus share the first identifier and the second identifier with the workspace reservation software 404 for the comparison.

The workspace reservation software 404 may perform the comparison by querying (e.g., using a database query language, such as SQL) one or more of the data stores 410 through 414 for records associated with the first identifier and the second identifier. In one particular example, the workspace reservation software 404 can perform a first level query against the reservation records data store 414 for a reservation record stored therein which includes the second identifier and a current time at which the first and second identifiers are obtained to determine whether any such records correspond to the workspace 416 for that current time, such as by those records including the second identifier (e.g., to determine whether an active reservation for the workspace 416 which includes the workspace resource 418 exists). The workspace reservation software 404 can then perform a second level query against the results of the first level query to determine whether any such records correspond to the user, such as by those records including the first identifier. A match between the reservation record and the first identifier and the second identifier may be determined where the second level query results identify a reservation record that includes the first identifier. In some cases, a single query for both the first identifier and the second identifier may be run instead of two separate queries as described above; however, where that single query returns zero results, a second query for only the second identifier should be run to determine whether an active reservation for the workspace 416 other than for the user exists. The results of the comparison between the reservation record and the first identifier and the second identifier may thus indicate not only whether an active reservation for the workspace 416 exists, but whether the user who is currently occupying the workspace 416 is the user for whom the workspace 416 is then-currently reserved.

Where the results of such comparison indicate that the user is the user for whom the workspace 416 is then-currently reserved (e.g., the active reservation for the workspace 416 is by or for the user), such as because a reservation record associated with the workspace 416 at a then-current time identifies the first identifier associated with the user resource 420 and/or other information associated with the user, the output provided may in some cases indicate a successful user verification for the workspace 416. Where the results of such comparison indicate that the user is other than the user for whom the workspace 416 is then-currently reserved (e.g., the active reservation for the workspace 416 is not by or for the user), such as because a reservation record associated with the workspace 416 at a then-current time omits the first identifier associated with the user resource 420 and other information associated with the user, the output provided may be based on whether an active reservation for the workspace 416 for another user exists, whether overlapping the time at which the user occupies the workspace or starting at a time shortly after the user begins occupying the workspace 416. For example, where an active reservation for the workspace 416 for another user exists for an overlapping time, the output provided may indicate that the user is in the wrong workspace and include an illustrative map or other information directing the user to the actual workspace reserved by or for the user. In another example, where an active reservation for the workspace 416 for another user exists for a later time, the output may indicate a start time for that reservation and prompt the user to either go to their actual workspace (e.g., using an illustrative map or other information, as described above) or change their reservation to be for the workspace 416 until the start of the reservation for the other user. In yet another example, where no active reservation for the workspace 416 exists, the output may include a prompt for allowing the user to change their reservation to be for the workspace 416. In some implementations, where another user is determined to have an active reservation for the workspace 416, the workspace reservation software 404 may change the reservation for that other user to a different workspace or transmit a message (e.g., via a client application push notification, an email, or a text message) to that other user to enable that other user to select a different workspace, if they choose to do so.

Where the results of such comparison indicate that the user is the user for whom the workspace 416 is then-currently reserved or otherwise after the user has relocated to the correct workspace and connected their user resource 420 to the workspace resource in that correct workspace, the workspace reservation software 404 may present, or cause to be presented, information associated with the workspace, the subject premises, and/or other users present at the subject premises for the same day based on other reservation records. In some cases, where the user resource 420 is a computing device such as a laptop, the information may include an illustration of the premises which includes the workspace 416 to show the user where various areas of interest at the premises are located relative to a location of the workspace 416, or the like. For example, the illustration may be a map showing a location of the workspace 416 and paths which may be traveled between the workspace 416 and one or more of a bathroom, a lobby, a breakroom, a printer, or a supply area. In some cases, the map may further show locations of one or more other users for whom active reservations for other workspaces are ongoing, such as by the locations of such other workspaces.

The workspace reservation software 404 may further be configured to terminate a workspace reservation prior to a scheduled end time thereof. For example, the workspace reservation software 404 may, at periodic intervals such as once per minute, receive data indicating whether the user resource 420 remains connected to the workspace resource 418. Where the data over multiple consecutive periodic intervals indicates that the user resource 420 is not connected to the workspace resource 418, the workspace reservation software 404 may determine whether a total amount of time comprising those multiple consecutive periodic intervals exceeds a threshold (e.g., specific to a given workspace or defined universally for all workspaces at the premises or otherwise), for example, 30 minutes. Where the threshold is exceeded, an assumption may be made that the subject user has left the workspace. In some such cases, the workspace reservation software 404 may transmit a message to the subject user, such as via text message, email, or push notification, requesting the user to verify whether they have left the workspace 416. If the user responds to the message indicating that they have left the workspace 416 or does not respond to the message within another threshold period of time (e.g., 10 minutes), the workspace reservation software 404 determines that the reservation for the workspace by or for the user has ended and accordingly terminates that reservation prior to the scheduled end time therefor.

In some implementations, the workspace reservation software 404 may, based on the initial threshold being exceeded, access a calendar associated with the subject user to determine whether the user is in an appointment away from the workspace 416. For example, based on a determination according to calendar data that the user is in a meeting away from the workspace 416, early termination of the reservation may be suspended until after a scheduled end time for that meeting. In some implementations, whether the user leaves the workspace 416 early, at the scheduled end time, or after the scheduled end time for the subject reservation, the workspace reservation software 404 may transmit information associated with remaining meetings, traffic, or the like to a device registered to the user.

The following example use case is provided to illustrate an example situation by which the system 400 may be used. A user named John wants to come into their company's office (the premises) to work. From home, John access the workspace reservation software 404 using his home computer or smartphone, as the reservation device 406. John follows prompts presented by the workspace reservation software 404 to select an available workspace and completes the process to make the reservation therefor, for a reservation period starting at 9 AM local time and ending at 5 PM local time. Shortly before 9 AM, John arrives at their company's office, scans their badge at a check-in kiosk in the office lobby, and is granted access to the office. John travels to the workspace 416 which John believes is the one they reserved, enters the workspace 416, and connects his laptop computer, as the user resource 420, to a computer docking station, as the workspace resource 418. Based on the connection between the laptop computer and the computer docking station, agent software running at the laptop computer identifies a digital certificate issued to the laptop computer by John's employer's information technology department and a MAC address (e.g., an ethernet MAC address) associated with the computer docking station (e.g., with an ethernet port thereof). The agent software then transmits a first identifier corresponding to that digital certificate and a second identifier corresponding to that MAC address to the workspace reservation software 404 to perform a user verification process. The workspace reservation software 404 obtains the first identifier and the second identifier and compares the first identifier and the second identifier against a reservation record associated with the workspace 416 to determine whether John has an active reservation for the workspace 416. In particular, the workspace reservation software 404 queries the reservation records data store 414 based thereon the first identifier and the second identifier to determine whether a reservation record including both of those identifiers for a period of time corresponding to a time at which the laptop computer connects to the computer docking station exists. The comparison results indicate that John has actually reserved the workspace next to the workspace 416, and a different user named Kate has a reservation for the workspace 416 starting at 10 AM local time that day. Based on those results, output is presented at John's laptop computer, either via the display thereof or one or more monitors made available for use with the laptop computer via the computer docking station to which the laptop computer is connected. The output indicates that John is at the wrong workspace and identifies a location of the correct workspace they reserved within a map of the premises. The map may, for example, include a path showing how to travel from the workspace 416 to the correct workspace. The output further indicates that an active reservation for the workspace 416 is scheduled to begin at 10 AM local time. Based on that output, John disconnects his laptop computer from the computer docking station and travels to the correct workspace. John connects his laptop computer to the computer docking station located at that correct workspace, which, via the agent software, performs another user verification process using the same first identifier and a new second identifier corresponding to the MAC address associated with the computer docking station in the correct workspace. Output based on a comparison as described above is presented to John via one or more displays, as described above. This time, because John is now at the correct workspace, the output includes a map illustrating locations of areas of interest within the office relative to the correct workspace so that, amongst other things, John knows where the nearest bathroom and printer are located. John accordingly works at the correct workspace and decides to leave the office early, at 4 PM local time. John disconnects his laptop computer from the computer docking station and leaves the office. The workspace reservation software 404 determines after a threshold period of time, such as 30 minutes, that no signal has been received from a device at the correct workspace for that threshold period of time. Based on that determination, the workspace reservation software 404 transmits a message to a mobile device registered to John (e.g., via text message or a push application) to ask John to verify whether he is still using the workspace. John responds to the message indicating that he is not, and the workspace reservation software 404 accordingly terminates John's reservation prior to the scheduled end time of 5 PM local time therefor. The workspace is now listed as available for reservation until a next scheduled reservation therefor.

In some implementations, the comparison between the first identifier and the second identifier and the reservation record associated with the workspace 416 may be performed other than by the workspace reservation software 404. For example, agent software running locally at the user resource 420 may perform such comparison using access to the reservation records data store 414 granted to the agent software. In some such implementations, where results of the comparison indicate that the subject user does not have an active reservation for the workspace 416, the agent software may communicate information indicative of those results to the workspace reservation software 404 to enable the workspace reservation software 404 to perform one or more resolution actions as described above, such as by prompting the user to modify their existing workspace reservation.

In some implementations, a component health check for workspace resources including the workspace resource 418 may be performed based on the user resource 420 connecting to the workspace resource 418 or based on a successful verification of the user and the subject workspace. In some such implementations, where the user resource 420 is a computing device (e.g., a laptop or tablet computer or a mobile phone), agent software running at the user resource 420 may, based on the connection between the user resource 420 and the workspace resource 418, initiate the component health check using instructions received from the workspace reservation software 404 or other software. For example, the component health check may be performed using diagnostic software for testing functionality of one or more hardware and/or software components associated with the workspace resource 418 and/or the user resource 420. In one such case, where the workspace resource 418 is a computer docking station to which multiple monitors, a keyboard, a mouse, and a camera are connected for use by the user resource 420 when docked, the component health check may include determining whether each of those components is detectable. The diagnostic software may, for example, via the agent software or otherwise have operating system-level access to the user resource 420 to perform the component health check. In some such implementations, where one or more components are determined based on the component health check to be partially or wholly inoperable, the workspace 416 may be temporarily delisted from the workspace reservation software 404 to suspend further reservations therefor until an administrator has resolved the partial or whole inoperability issue. In some such cases, users with reservations for the workspace 416 may accordingly be notified and prompted to select a different workspace for their reservation periods.

In some implementations, the workspace 416 may include one or more cameras configured to capture images within one or more areas of the workspace 416. The images captured by those one or more cameras may be transmitted to an administrator (e.g., an information technology administrator managing or otherwise operating the premises at which the workspace 416 is located) to alert the administrator as to an issue associated with the workspace 416 and/or to request assistance with respect to the issue. For example, a camera may be fixedly pointed at cables located behind a computer docking station (e.g., as the workspace resource). Object recognition or other computer vision analysis can be performed against images captured using the one or more cameras to detect one or more of those cables which are disconnected. In some such cases, the administrator may receive an alert indicating the disconnection of those one or more cables (e.g., via a text message including text identifying a disconnection and/or including a subject image). The administrator may then call the user at a desktop phone located in the workspace or a mobile phone associated with the user to inform them of the disconnection.

In some such implementations, where the output of the component health check indicates that one or more of the workspace resources is partially or wholly inoperable, the workspace reservation software 404 may identify one or more other workspaces at the subject premises and present, or cause to be presented, output for display to the user to prompt the user to select a different workspace to use. For example, where the user resource 420 is a computing device, an illustrative or text-based list of available workspaces may be presented to the user via a display of the computing device to enable the user to select a different workspace to reserve from the list of available workspaces. In some cases, the output may ask the user to indicate whether they would like to find a different workspace before presenting such a list of available workspaces. The user may, for example, elect to remain at the current workspace notwithstanding the partial or whole inoperability of the one or more workspace resources.

In many cases, the premises at which the workspace 416 (and a correct workspace, as applicable) is located is used exclusively by or for a single entity, such as a single customer of a software platform (e.g., the customer 1 102A or the customer N 102B shown in FIG. 1, as a customer of the software platform 300 shown in FIG. 3). For example, the premises may be an office used by a single company. However, in some implementations, the premises may be a shared premises available to users associated with multiple customers of a software platform. In such shared premises scenarios, an administrator of the premises may not be associated with one or more of those multiple customers specifically, but may instead be retained by an operator of the shared premises to manage use of the premises by users of the multiple customers. For example, where the first identifier associated with the user resource 420 corresponds to a digital certificate issued by an information technology administrator associated with a customer of the software platform, the administrator of the shared premises may be someone other than that information technology administrator.

Figure 5:
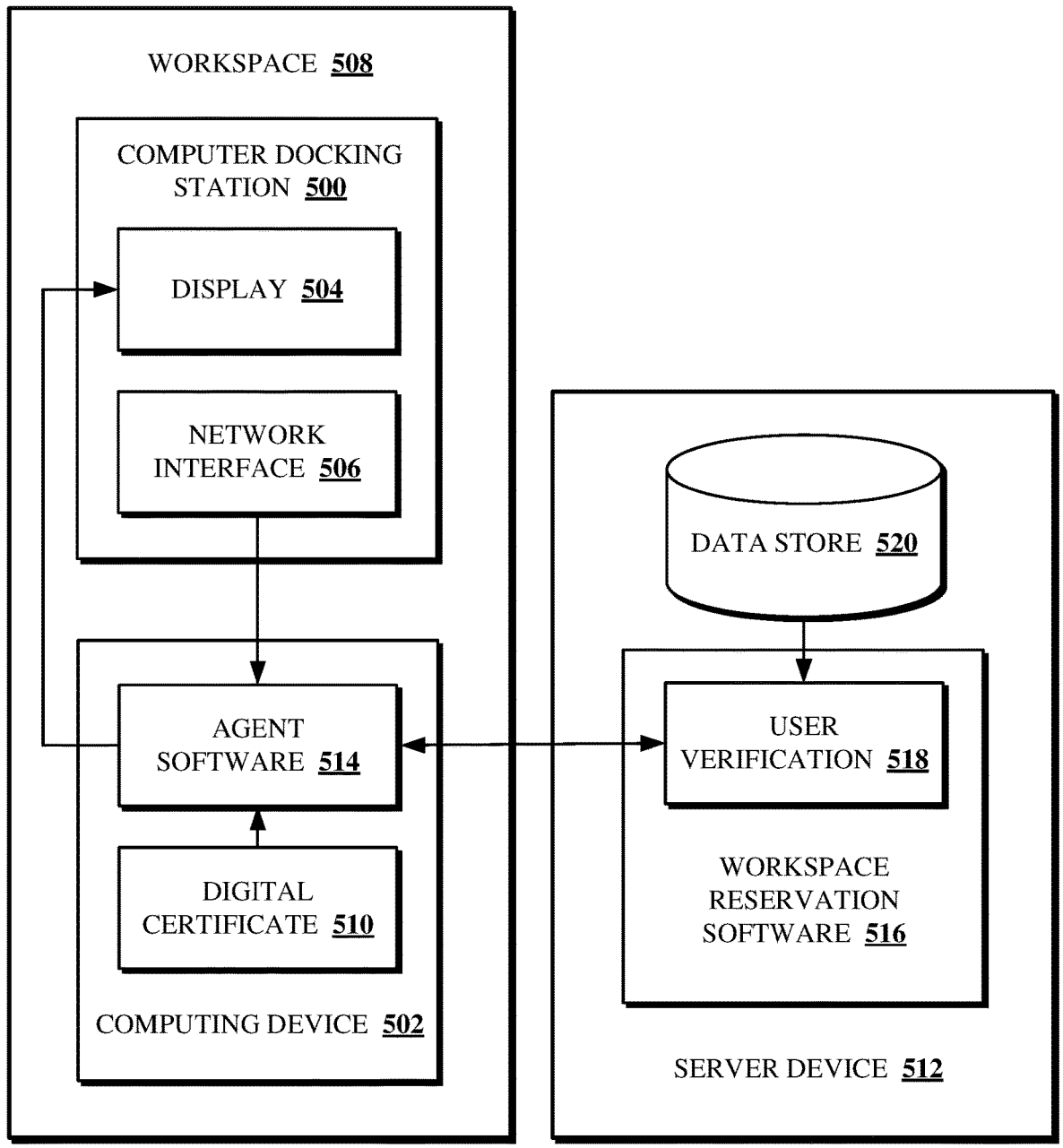
FIG. 5 is a block diagram of an example of workspace reservation user verification using a first identifier associated with a computer docking station and a second identifier associated with a computing device connected to the computer docking station.

FIG. 5 is a block diagram of an example of workspace reservation user verification using a first identifier associated with a computer docking station 500 and a second identifier associated with a computing device 502 connected to the computer docking station 500. In particular, FIG. 5 shows components involved in and operations performed by the system 400 shown in FIG. 4 in which the computer docking station 500 is the workspace resource 418 shown in FIG. 4 and the computing device 502 is the user resource 420 shown in FIG. 4.

Computer docking stations are conventionally provisioned for use at workspaces, and so the use of computer docking stations as part of a workspace reservation user verification process may be particularly valuable. That is, some or all of the workspaces at a subject premises may have a computer docking station usable to establish connections between a docked computing device and one or more of input peripherals (e.g., a keyboard, mouse, microphone, and/or camera), output peripherals (e.g., one or more displays and/or speakers), and a network interface (e.g., including an ethernet port for wired connection and/or a wireless component such as a Wi-Fi chip for wireless connection). To use a computer docking station, such as the computer docking station 500, a user of a computing device, such as the computing device 502, may physically connect the computing device 502 to the computer docking station 500 using one or more wires (e.g., via proprietary ports or USB ports). Once connected to the computer docking station 500, the computing device 502 is considered to be docked and may thus have access to, control, or otherwise use the input peripherals, output peripherals, and/or network interface available via the computer docking station 500. In particular, the computer docking station 500 includes at least one display 504 and a network interface 506, which is configured with (e.g., has assigned to it) a unique identifier, for example, a MAC address. For example, the unique identifier may be an ethernet MAC address where the network interface 506 is or otherwise refers to an ethernet port. In another example, the unique identifier may be a MAC address of a chip which enables computing devices connected to the computer docking station to access a wireless network at the subject premises where the network interface 506 is or otherwise refers to such chip. The at least one display 504 is at least one monitor configured for use with the computer docking station 500 and thus with the computing device 502 when connected to the computer docking station 500.

In some implementations, a short range wireless communication protocol such as Bluetooth may be used to wirelessly connect the computing device 502 to the computer docking station 500. For example, in situations in which the premises includes a large number of workspaces, interference blockers may be used (e.g., by embedding in workspace walls) to enable wireless communication between the computing device 502 and the computer docking station 500 while minimizing or preventing interference from other workspaces.

The unique identifiers (e.g., the ethernet MAC addresses) assigned to various computer docking stations located at different workspaces within a premises can be used to identify specific workspaces at which computing devices are connected to those computer docking stations. In particular, an administrator (e.g., an information technology administrator) may have access to workspace data associated with reservable workspaces at a premises (e.g., via the workspace records data store 412 shown in FIG. 4). The workspace data may be expressed in a text or illustrative format. For example, the workspace data may include a table associating identifiers of workspaces with network identifiers of computer docking stations located at those workspaces. Thus, a workspace 508, which may, for example, be the workspace 416 shown in FIG. 4, may be specifically identifiable based on the network identifier (e.g., the ethernet MAC address) assigned to the network interface 506.

Other identifiers may be used to uniquely identify the computing device 502 and thus the user of the computing device 502. In particular, the computing device 502 may have a digital certificate 510 issued to is from an issuing body, such as an administrator associated with the premises at which the workspace 508 is located. For example, the administrator may issue certificates to computing devices authorized for use with an operator of the premises (e.g., as a customer of a software platform). The digital certificate 510 enables two-way authentication between the computing device 502 to which the digital certificate 510 is issued and one or more software services associated with the operator of the premises. As such, the digital certificate 510 may be used to uniquely identify a given user based on their computer activity. While digital certificate 510 operates to uniquely identify the computing device 502, other identifiers, such as login credentials specifically assigned to a particular user, may be used to uniquely identify the user as a user of the computing device 502. For example, when the user of the computing device 502 connects the computing device 502 to the computer docking station 500, the user may enter their login credentials (e.g., as a domain-specific username and password combination) as part of a typical process for authenticating their use of the computing device 502.

An example workflow for workspace reservation user verification using the computer docking station 500 and the computing device 502 will now be described. A user of the computing device 502 enters the workspace 508 and connects their computing device 502 to the computer docking station 500, for example, using a USB-C or similar cable. The user logs into the computing device 502 using login credentials authenticating access by the user to the computing device 502. Once the user is authenticated at the computing device 502 via the login credentials, or prior to such authentication, a signal is transmitted from the computing device 502 to a server device 512, which may, for example, be the server device 402 shown in FIG. 4, to cause the server device 402 to determine that the computing device 502 is connected to the computer docking station 500.

Based on the computing device 502 connecting to the computer docking station 500, agent software 514 running at the computing device 502 obtains at least a first identifier associated with the computing device 502 and a second identifier associated with the computer docking station 500. Here, the first identifier corresponds to the digital certificate 510 issued to the computing device 502 and the second identifier corresponds to the network identifier (e.g., the ethernet MAC address) assigned to the network interface 506 and thus to the computer docking station 500. The agent software 514, which may, for example, be, include, or otherwise refer to a background software process associated with a client application installed or otherwise run on the computing device 502, uses operating system-level access permissions to obtain the first identifier in connection with the digital certificate 510. For example, the first identifier may be an alphanumeric (e.g., hexadecimal) value assigned to the digital certificate 510, associated with the digital certificate 510, or generated (e.g., using a hashing technique) based on information associated with the digital certificate 510. The agent software 514 may use those same operating system-level access permissions to obtain the second identifier in connection with the network interface 506. For example, the second identifier may be an ethernet MAC address assigned to the network interface 506 or an identifier representative of the ethernet MAC address. The agent software 514 may, for example, obtain the network identifier from a list of devices available to the computing device 502, in which the network interface 506 or the computer docking station 500 itself may become available to the list of devices based on the computing device 502 connecting to the computer docking station 500. In some cases, the agent software 514 may also obtain an identifier associated with the login credentials used to authenticate the user at the computing device 502, such as a username of the user.

The agent software 514 then transmits the first identifier and the second identifier to workspace reservation software 516, which may, for example, be the workspace reservation software 404 shown in FIG. 4. The workspace reservation software 516 includes a user verification tool 518 that performs a workspace reservation user verification process based on the first identifier and the second identifier transmitted from the agent software 514. In particular, the user verification tool 518 obtains the first identifier and the second identifier from the agent software 514, and thus from the computing device 502, and then compares the first identifier and the second identifier against a reservation record associated with the workspace 508 to determine whether the user of the computing device 502 has an active reservation for the workspace 508. The user verification tool 518 access the reservation record within a data store 520, which may, for example, be the reservation records data store 414 shown in FIG. 4, such as by querying the data store 520 based on the first identifier and the second identifier as described above with respect to FIG. 4.

Based on results of the querying (e.g., an outcome of the comparison), a determination is made as to whether the user of the computing device 502 has an active reservation for the workspace 508. The user verification tool 518 transmits the outcome of the comparison or data indicative of such outcome to the agent software 514. The agent software 514 uses that outcome or indicative data to cause output to be presented for display at the computing device 502, for example, at the display 504 made available to the computing device 502 via the connection of the computing device 502 to the computer docking station 500. Thus, the specific output presented at the display 504 is based on whether or not there was a successful verification of the user occupying the workspace 508, which the verification is successful where the outcome of the comparison indicates an active reservation for the workspace 508 by or for the user and in which the verification is otherwise unsuccessful. Implementations and examples of output which may be presented at the computing device 502 based on a successful or unsuccessful verification of the user occupying the workspace 508.

Figure 6A:
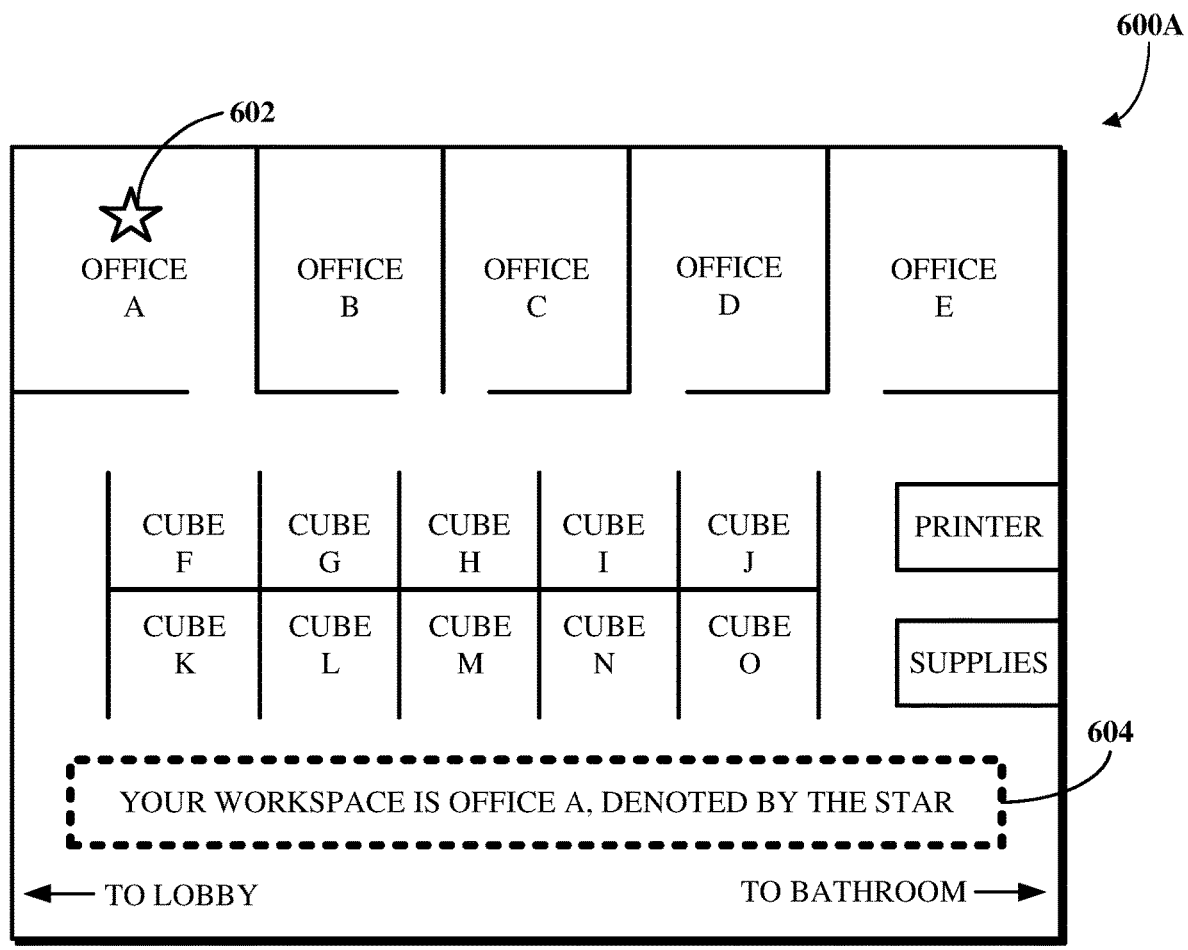
FIG. 6A is an illustration of an example of output presented at a computing device based on a successful verification of a user occupying a workspace.

FIG. 6A is an illustration of an example of output presented at a computing device, such as the computing device 502 shown in FIG. 5, based on a successful verification of a user occupying a workspace, such as the workspace 508 shown in FIG. 5. The output is represented within a graphical user interface 600A, which may be output for display at the computing device, such as via a client application, agent software, or the like. The graphical user interface 600A depicts a premises at which the workspace occupied by the user is located. In the example shown, the graphical user interface 600A depicts the workspace at which the user is located using a star element 602. Here, the workspace the user is located in, and which the user has an active reservation for, is labeled Office A. The locations of other workspaces at the premises, including Offices B through E and Cubes (i.e., cubicles) F through O, are shown in the graphical user interface 600A, along with locations of certain areas of interest, including a lobby, a bathroom, a printer, and a supply area. A message 604 may be output within the graphical user interface 600A to indicate the workspace in which the user is located. As shown, the message 604 reports to the user that their workspace is Office A, as denoted by the star element 602.

Figure 6B:
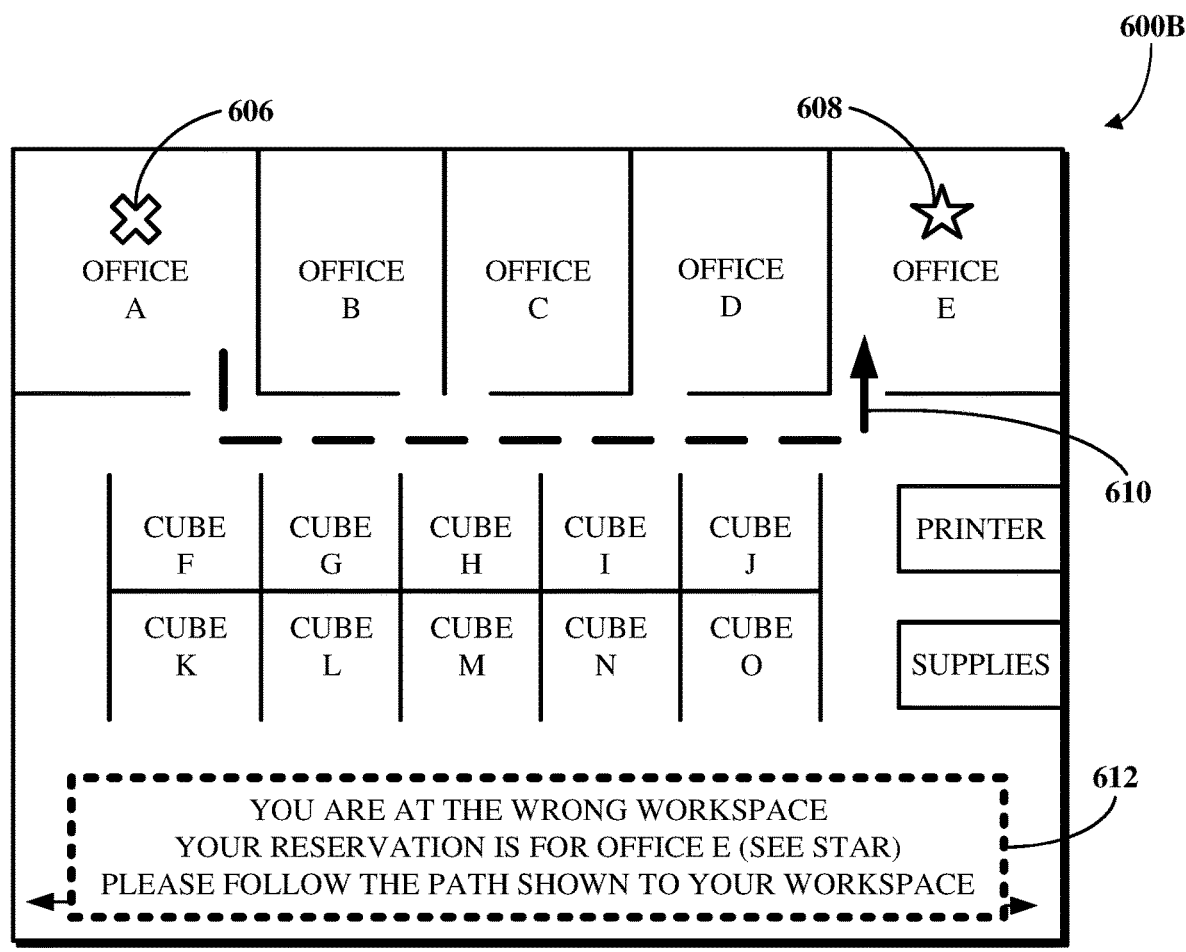
FIG. 6B is an illustration of an example of output presented at a computing device based on an unsuccessful verification of a user occupying a workspace.

FIG. 6B is an illustration of an example of output presented at a computing device, such as the computing device 502 shown in FIG. 5, based on an unsuccessful verification of a user occupying a workspace, such as the workspace 508 shown in FIG. 5. As with FIG. 6A, the output is represented within a graphical user interface 600B, which may be output for display at the computing device, such as via a client application, agent software, or the like. The graphical user interface 600B depicts the same premises as is shown in the graphical user interface 600A shown in FIG. 6A. In the example shown, the graphical user interface 600B depicts the workspace at which the user is currently located using an X element 606. That workspace, which is labeled Office A, is the workspace at which the user is determined to be located based on a user verification process as disclosed herein, but is not the workspace that was reserved by or for the user. Rather, the graphical user interface 600B depicts the workspace that was actually reserved by or for the user using a star element 608. That workspace, which is labeled Office E, is located down the hall from Office A. A path 610 is shown in the graphical user interface 600B by a dashed arrow starting in Office A and ending in Office E to show the user how to travel to the correct workspace. A message 612 may be output within the graphical user interface 600B to indicate to the user that they are in the wrong workspace and to identify the correct workspace. As shown, the message 612 reports to the user that they are in the wrong workspace, that their reservation is for Office E, as denoted by the star element 608, and to please follow the path 610 shown to that workspace.

Figure 7:
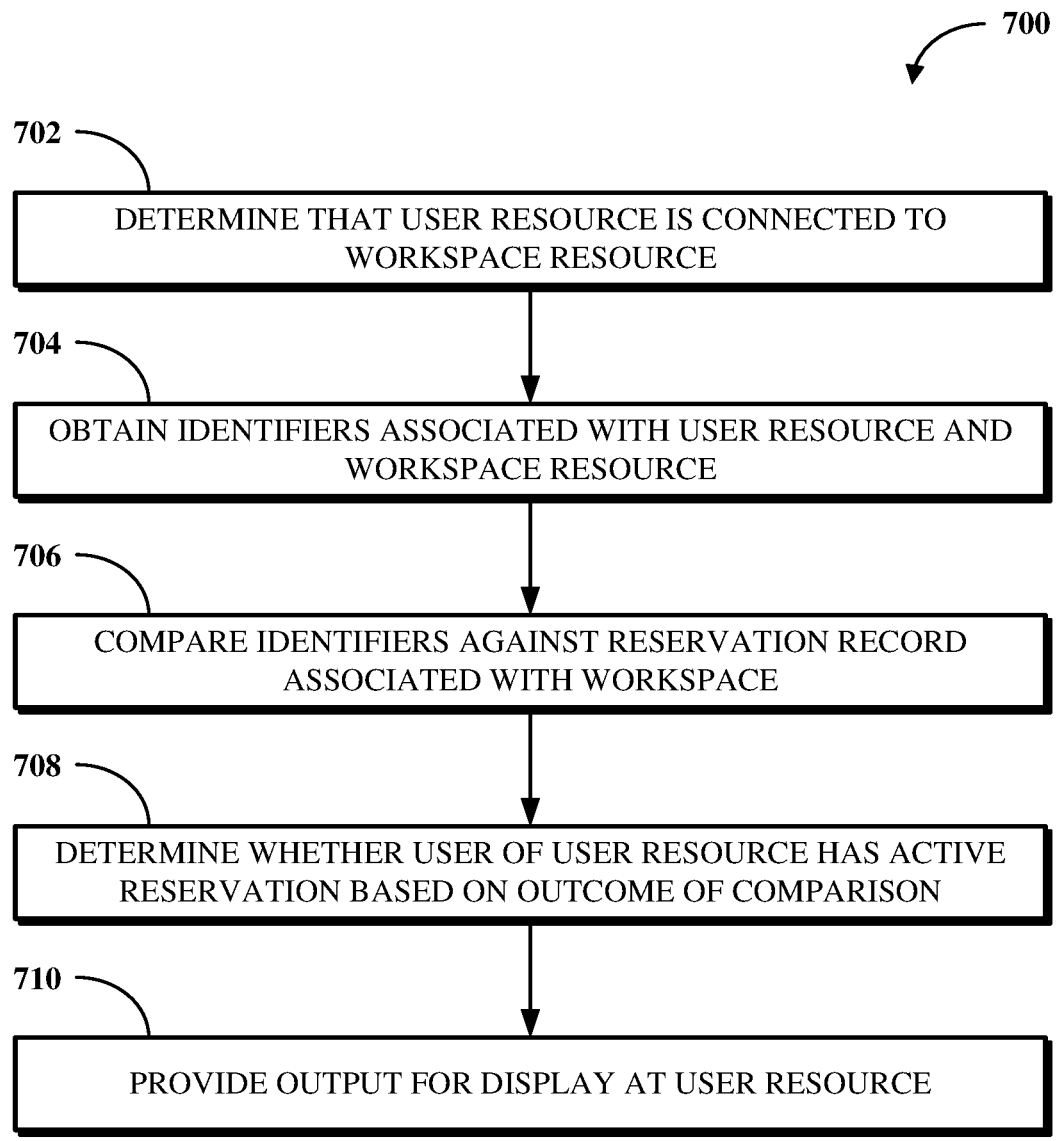
FIG. 7 is a flowchart of an example of a technique for workspace reservation user verification.

To further describe some implementations in greater detail, reference is next made to examples of techniques which may be performed by or using a system for workspace reservation user verification. FIG. 7 is a flowchart of an example of a technique 700 for workspace reservation user verification. The technique 700 can be executed using computing devices, such as the systems, hardware, and software described with respect to FIGS. 1-6B. The technique 700 can be performed, for example, by executing a machine-readable program or other computer-executable instructions, such as routines, instructions, programs, or other code. The steps, or operations, of the technique 700 or another technique, method, process, or algorithm described in connection with the implementations disclosed herein can be implemented directly in hardware, firmware, software executed by hardware, circuitry, or a combination thereof.

For simplicity of explanation, the technique 700 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 702, a determination is made that a user resource is connected to a workspace resource. The connection between the user resource and the workspace resource may be via wired or wireless connection. For example, the user resource may be a computing device such as a laptop computer and the workspace resource may be a computer docking station to which one or more of a keyboard, mouse, camera, and network connection are made available to the computing device when docked. The computing device is determined to be connected to the computer docking station based on information signaled to a server device running workspace reservation software in response to the connection of the computing device to the computer docking station and/or an authentication of a user of the computing device using login credentials entered at the computing device.

At 704, identifiers associated with the user resource and the workspace resource are obtained based on the user resource connecting to the workspace resource. The identifiers include a first identifier associated with the user resource and a second identifier associated with the workspace resource. For example, where the user resource is a computing device and the workspace resource is a computer docking station, the first identifier may correspond to a digital certificate issued to the computing device and the second identifier may correspond to a network identifier (e.g., an ethernet MAC address or other MAC address) assigned to the computer docking station. The first identifier may be obtained by agent software running at the computing device based on the user of the computing device logging into the computing device using login credentials. The second identifier may be obtained by the same agent software running at the computing device accessing a device list including one or more devices or components made available to the computing device via the computing device connecting to the computer docking station. In some implementations, the identifiers may further include a third identifier corresponding to login credentials used to authenticate access to the computing device by the user of the computing device. For example, the third identifier may be obtained from the agent software along with the first identifier and the second identifier. The first identifier and the third identifier may together be usable to identify the user of the computing device.

At 706, the identifiers are compared against a reservation record associated with the workspace, and, at 708, a determination is made as to whether the user of the user resource has an active reservation for the workspace based on an outcome of the comparison. In particular, the identifiers are compared against the reservation record to determine whether the user of the user resource has an active reservation for the workspace. A reservation record is a record stored within a data store, such as a reservation records data store, and includes information usable to indicate, for a given reservation for a workspace, information associated with the workspace, information associated with a user by or for whom the reservation is made, and a period of time during which the reservation is active (e.g., by a start time and a total length of time or a start time and an end time). Thus, comparing the identifiers against the reservation record can include determining whether a reservation corresponding to a time at which the user resource connects to the workspace resource exists for the user of the user resource to use the workspace. For example, where there is no reservation record identifying the identifiers, the comparison indicates that the user is not associated with an active reservation for the workspace.

In some cases, comparing the identifiers against the reservation record and determining whether the user of the user resource has an active reservation for the workspace based on an outcome of the comparison can include querying a data store storing the reservation record based on one or both of the first identifier or the second identifier to identify the reservation record, in which the outcome of the comparison indicates that the user of the computing device has an active reservation for the workspace where the reservation record indicates a reservation for the workspace by or for the user of the computing device at a time at which the computing device connects to the computer docking station. In some cases, comparing the identifiers against the reservation record and determining whether the user of the user resource has an active reservation for the workspace based on an outcome of the comparison can include performing a first level query against records of a data store based on the second identifier to identify multiple reservation records associated with the workspace, and performing a second level query against the multiple reservation records of the data store based on the first identifier to identify the reservation record from amongst the multiple reservation records.

At 710, output is provided for display at the user resource based on the determination as to whether the user of the user resource has an active reservation for the workspace. Providing the output for display at the user resource can include transmitting data configured to cause the output to be displayed to the user resource. For example, where the user resource is a computing device and the workspace resource is a computer docking station, providing the output for display can include transmitting, to agent software running at the computing device, data configured to cause the output to be presented at a monitor connected to the computer docking station. For example, where the outcome of the comparison indicates that the user of the computing device has an active reservation for the workspace, providing the output for display at the computing device can include presenting a map illustrating a premises at which the workspace is located, in which the map identifies a location of the workspace at the premises and locations of one or more areas of interest within the premises. In another example, where the outcome of the comparison indicates that the user of the computing device does not have an active reservation for the workspace, providing the output for display at the computing device can include presenting, using a client application running at the computing device, a prompt usable by the user of the computing device to make a reservation for the workspace. In yet another example, where the outcome of the comparison indicates that the user of the computing device does not have an active reservation for the workspace, providing the output for display at the computing device can include presenting, using a client application running at the computing device, a prompt indicating that the workspace is currently unavailable and identifying one or more other workspaces available for reservation by the user of the computing device. In still a further example, where the outcome of the comparison indicates that the user of the computing device does not have an active reservation for the workspace, providing the output for display at the computing device can include presenting, using a client application running at the computing device, a prompt usable by the user of the computing device to make a reservation for the workspace, in which case a reservation for the workspace for a different user may be changed to a different workspace based on the user of the computing device making the reservation for the workspace via the prompt. In yet another further example, where the outcome of the comparison indicates that the user of the computing device does not have an active reservation for the workspace, providing the output for display at the computing device can include presenting, using a client application running at the computing device, a prompt usable by the user of the computing device to make a reservation for the workspace until a start time of a reservation for the workspace for a different user.

The implementations of this disclosure correspond to methods, non-transitory computer readable media, apparatuses, systems, devices, and the like. In some implementations, a method comprises determining that a computing device is connected to a computer docking station located at a workspace; based on the computing device connecting to the computer docking station, obtaining, from the computing device, a first identifier associated with the computing device and a second identifier associated with the computer docking station; comparing the first identifier and the second identifier against a reservation record associated with the workspace to determine whether a user of the computing device has an active reservation for the workspace; and providing output for display at the computing device based on an outcome of the comparison. In some implementations, a non-transitory computer readable medium stores instructions operable to cause one or more processors to perform operations comprising determining that a computing device is connected to a computer docking station located at a workspace; based on the computing device connecting to the computer docking station, obtaining, from the computing device, a first identifier associated with the computing device and a second identifier associated with the computer docking station; comparing the first identifier and the second identifier against a reservation record associated with the workspace to determine whether a user of the computing device has an active reservation for the workspace; and providing output for display at the computing device based on an outcome of the comparison. In some implementations, an apparatus comprises a memory and a processor configured to execute instructions stored in the memory to determine that a computing device is connected to a computer docking station located at a workspace; based on the computing device connecting to the computer docking station, obtain, from the computing device, a first identifier associated with the computing device and a second identifier associated with the computer docking station; compare the first identifier and the second identifier against a reservation record associated with the workspace to determine whether a user of the computing device has an active reservation for the workspace; and provide output for display at the computing device based on an outcome of the comparison.

In some implementations of the method, non-transitory computer readable medium, or apparatus, the first identifier corresponds to a digital certificate issued to the computing device and the second identifier corresponds to an ethernet MAC address assigned to the computer docking station.

In some implementations of the method, non-transitory computer readable medium, or apparatus, comparing the first identifier and the second identifier against the reservation record comprises determining whether a reservation corresponding to a time at which the computing device connects to the computer docking station exists for the user of the computing device to use the workspace.

In some implementations of the method, non-transitory computer readable medium, or apparatus, where the outcome of the comparison indicates that the user of the computing device has an active reservation for the workspace, providing the output for display at the computing device comprises presenting a map illustrating a premises at which the workspace is located, wherein the map identifies a location of the workspace at the premises and locations of one or more areas of interest within the premises.

In some implementations of the method, non-transitory computer readable medium, or apparatus, where the outcome of the comparison indicates that the user of the computing device does not have an active reservation for the workspace, providing the output for display at the computing device comprises presenting, using a client application running at the computing device, a prompt usable by the user of the computing device to make a reservation for the workspace.

In some implementations of the method, non-transitory computer readable medium, or apparatus, where the outcome of the comparison indicates that the user of the computing device does not have an active reservation for the workspace, providing the output for display at the computing device comprises presenting, using a client application running at the computing device, a prompt indicating that the workspace is currently unavailable and identifying one or more other workspaces available for reservation by the user of the computing device.

In some implementations of the method, non-transitory computer readable medium, or apparatus, the first identifier is obtained using agent software running at the computing device in response to a connection of the computing device to the computer docking station.

In some implementations of the method, non-transitory computer readable medium, or apparatus, the first identifier corresponds to a digital certificate issued to the computing device and the second identifier corresponds to an ethernet MAC address assigned to the computer docking station, and a third identifier corresponding to login credentials used to authenticate access to the computing device by the user of the computing device are obtained along with the first identifier and the second identifier, in which the first identifier and the third identifier together are usable to identify the user of the computing device.

In some implementations of the method, non-transitory computer readable medium, or apparatus, the method comprises, the operations comprise, and the processor is configured to execute the instructions for performing a component health check for workspace resources at the workspace based on the computing device connecting to the computer docking station.

In some implementations of the method, non-transitory computer readable medium, or apparatus, the output includes a map illustrating a premises at which the workspace is located, where the outcome of the comparison indicates that the user of the computing device has an active reservation for the workspace, the map identifies a location of the workspace at the premises and locations of one or more areas of interest within the premises, and, where the outcome of the comparison indicates that the user of the computing device does not have an active reservation for the workspace, the map identifies a location of a correct workspace for the user of the computing device and includes a path to travel between the workspace and the correct workspace.

In some implementations of the method, non-transitory computer readable medium, or apparatus, comparing the first identifier and the second identifier against the reservation record associated with the workspace comprises querying a data store storing the reservation record based on one or both of the first identifier or the second identifier to identify the reservation record, wherein the outcome of the comparison indicates that the user of the computing device has an active reservation for the workspace where the reservation record indicates a reservation for the workspace by or for the user of the computing device at a time at which the computing device connects to the computer docking station.

In some implementations of the method, non-transitory computer readable medium, or apparatus, the first identifier and the second identifier are obtained from agent software running at the computing device.

In some implementations of the method, non-transitory computer readable medium, or apparatus, the first identifier corresponds to a digital certificate issued to the computing device and is obtained by agent software running at the computing device based on the user of the computing device logging into the computing device using login credentials.

In some implementations of the method, non-transitory computer readable medium, or apparatus, the second identifier corresponds to an ethernet MAC address assigned to the computer docking station and is obtained by agent software running at the computing device accessing a device list including one or more devices or components made available to the computing device via the computing device connecting to the computer docking station.

In some implementations of the method, non-transitory computer readable medium, or apparatus, comparing the first identifier and the second identifier against the reservation record associated with the workspace comprises performing a first level query against records of a data store based on the second identifier to identify multiple reservation records associated with the workspace; and performing a second level query against the multiple reservation records of the data store based on the first identifier to identify the reservation record from amongst the multiple reservation records.

In some implementations of the method, non-transitory computer readable medium, or apparatus, where the outcome of the comparison indicates that the user of the computing device does not have an active reservation for the workspace, the output includes a prompt usable by the user of the computing device to make a reservation for the workspace, in which the method comprises, the operations comprise, and the processor is configured to execute the instructions for, based on the user of the computing device making the reservation for the workspace via the prompt, changing a reservation for the workspace for a different user to a different workspace.

In some implementations of the method, non-transitory computer readable medium, or apparatus, where the outcome of the comparison indicates that the user of the computing device does not have an active reservation for the workspace, the output includes a prompt usable by the user of the computing device to make a reservation for the workspace until a start time of a reservation for the workspace for a different user.

In some implementations of the method, non-transitory computer readable medium, or apparatus, providing the output for display at the computing device comprises transmitting, to agent software running at the computing device, data configured to cause the output to be presented at a monitor connected to the computer docking station.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    determining that a computing device is connected to a first computer docking station located at a first desk;
    based on the computing device connecting to the first computer docking station, comparing a first identifier associated with the computing device and a second identifier associated with the first computer docking station against a first reservation record associated with the first desk to determine that a user of the computing device does not have an active reservation for the first desk;
    based on the determination that the user of the computing device does not have an active reservation for the first desk, presenting, at the computing device, a prompt indicating that the first desk is unavailable and identifying a second desk available for reservation by the user of the computing device;
    storing a second reservation record associated with the second desk based on the prompt;
    determining that the computing device is connected to a second computer docking station located at the second desk;
    based on the computing device connecting to the second computer docking station, comparing the first identifier and a third identifier associated with the second computer docking station against the second reservation record to determine that the user of the computing device has an active reservation for the second desk; and
    based on the determination that the user of the computing device has an active reservation for the second desk, presenting output based on the active reservation for the second desk for display at the computing device.

2. The method of claim 1, wherein the first identifier corresponds to a digital certificate issued to the computing device, the second identifier corresponds to an ethernet MAC address assigned to the first computer docking station, and the third identifier corresponds to an ethernet MAC address assigned to the second computer docking station.

3. The method of claim 1, wherein comparing the first identifier and the second identifier against the first reservation record comprises:
    determining whether a reservation corresponding to a time at which the computing device connects to the first computer docking station exists for the user of the computing device to use the first desk.

4. The method of claim 1, wherein the output includes a map illustrating a premises at which the second desk is located, wherein the map identifies a location of the second desk at the premises and locations of one or more areas of interest within the premises.

5. The method of claim 1, wherein the prompt is usable by the user of the computing device to make a reservation for the second desk.

6. The method of claim 1, wherein the prompt identifies one or more other desks available for reservation by the user of the computing device, wherein the one or more other desks includes the second desk.

7. The method of claim 1, wherein the first identifier is obtained using agent software running at the computing device in response to a connection of the computing device to the first computer docking station.

8. A non-transitory computer readable medium storing instructions operable to cause one or more processors to perform operations comprising:
    determining that a computing device is connected to a first computer docking station located at a first desk;
    based on the computing device connecting to the first computer docking station, comparing a first identifier associated with the computing device and a second identifier associated with the first computer docking station against a first reservation record associated with the first desk to determine that a user of the computing device does not have an active reservation for the first desk;
    based on the determination that the user of the computing device does not have an active reservation for the first desk, presenting, at the computing device, a prompt indicating that the first desk is unavailable and identifying a second desk available for reservation by the user of the computing device;
    storing a second reservation record associated with the second desk based on the prompt;
    determining that the computing device is connected to a second computer docking station located at the second desk;
    based on the computing device connecting to the second computer docking station, comparing the first identifier and a third identifier associated with the second computer docking station against the second reservation record to determine that the user of the computing device has an active reservation for the second desk; and
    based on the determination that the user of the computing device has an active reservation for the second desk, presenting output based on the active reservation for the second desk for display at the computing device.

9. The non-transitory computer readable medium of claim 8, wherein the first identifier corresponds to a digital certificate issued to the computing device, the second identifier corresponds to an ethernet MAC address assigned to the first computer docking station, and the third identifier corresponds to an ethernet MAC address assigned to the second computer docking station, wherein a fourth identifier corresponding to login credentials used to authenticate access to the computing device by the user of the computing device are obtained along with the first identifier, and wherein the first identifier and the fourth identifier together are usable to identify the user of the computing device.

10. The non-transitory computer readable medium of claim 8, the operations comprising:
performing a component health check for workspace resources at the second desk based on the computing device connecting to the second computer docking station.

11. The non-transitory computer readable medium of claim 8, wherein the output includes a map illustrating a premises at which the second desk is located.

12. The non-transitory computer readable medium of claim 8, wherein the operations for comparing the first identifier and the third identifier against the second reservation record comprise:
querying a data store storing the second reservation record based on one or both of the first identifier or the third identifier to identify the second reservation record, wherein an outcome of the comparing indicates that the user of the computing device has an active reservation for the second desk based on the second reservation record indicating a reservation for the second desk by or for the user of the computing device at a time at which the computing device connects to the second computer docking station.

13. The non-transitory computer readable medium of claim 8, wherein the first identifier, the second identifier, and the third identifier are obtained from agent software running at the computing device.

14. An apparatus, comprising:
a memory; and
a processor configured to execute instructions stored in the memory to:
determine that a computing device is connected to a first computer docking station located at a first desk;
based on the computing device connecting to the first computer docking station, compare a first identifier associated with the computing device and a second identifier associated with the first computer docking station against a first reservation record associated with the first desk to determine that a user of the computing device does not have an active reservation for the first desk;
based on the determination that the user of the computing device does not have an active reservation for the first desk, present, at the computing device, a prompt indicating that the first desk is unavailable and identifying a second desk available for reservation by the user of the computing device;
store a second reservation record associated with the second desk based on the prompt;
determine that the computing device is connected to a second computer docking station located at the second desk;
based on the computing device connecting to the second computer docking station, compare the first identifier and a third identifier associated with the second computer docking station against the second reservation record to determine that the user of the computing device has an active reservation for the second desk; and
based on the determination that the user of the computing device has an active reservation for the second desk, present output based on the active reservation for the second desk for display at the computing device.

15. The apparatus of claim 14, wherein the first identifier corresponds to a digital certificate issued to the computing device and is obtained by agent software running at the computing device based on the user of the computing device logging into the computing device using login credentials.

16. The apparatus of claim 14, wherein the second identifier corresponds to an ethernet MAC address assigned to the first computer docking station and is obtained by agent software running at the computing device accessing a device list including one or more devices or components made available to the computing device via the computing device connecting to the first computer docking station.

17. The apparatus of claim 14, wherein, to compare the first identifier and the third identifier against the second reservation record, the processor is configured to execute the instructions to:
perform a first level query against records of a data store based on the third identifier to identify multiple reservation records associated with the second desk; and
perform a second level query against the multiple reservation records of the data store based on the first identifier to identify the second reservation record from amongst the multiple reservation records.

18. The apparatus of claim 14, wherein the prompt is usable by the user of the computing device to make a reservation for the second desk and the processor is configured to execute the instructions to:
based on the user of the computing device making the reservation for the second desk via the prompt, change a reservation for the second desk for a different user to a different desk.

19. The apparatus of claim 14, wherein the prompt is usable by the user of the computing device to make a reservation for the second desk until a start time of a reservation for the second desk for a different user.

20. The apparatus of claim 14, wherein, to present the output based on the active reservation for the second desk for display at the computing device, the processor is configured to execute the instructions to:
transmit, to agent software running at the computing device, data configured to cause a presentation of the output at a monitor connected to the second computer docking station.

* * * * *